United States Patent [19]

Aboujaoude et al.

[11] Patent Number: 5,367,875
[45] Date of Patent: Nov. 29, 1994

[54] AUTOMATED CATALYTIC REDUCTION SYSTEM

[75] Inventors: Francois W. Aboujaoude; Eugene A. Kasel, both of Roscoe, Ill.

[73] Assignee: Coltec Industries Inc, New York, N.Y.

[21] Appl. No.: 987,044

[22] Filed: Dec. 7, 1992

[51] Int. Cl.$^5$ ............................................. F01N 3/18
[52] U.S. Cl. ...................................... 60/303; 60/286; 60/301; 123/526
[58] Field of Search ............... 60/286, 295, 301, 303; 123/27 GE, 526

[56] References Cited

U.S. PATENT DOCUMENTS

| | | | |
|---|---|---|---|
| 3,599,427 | 8/1971 | Jones | 60/301 |
| 3,864,451 | 2/1975 | Lee et al. | 423/213.2 |
| 4,403,473 | 9/1983 | Gladden | 60/294 |
| 4,817,568 | 4/1989 | Bedford | 123/27 GE |
| 5,021,227 | 6/1991 | Kobayashi et al. | 60/286 |
| 5,136,986 | 8/1992 | Jensen | 123/527 |

Primary Examiner—Ira S. Lazarus
Assistant Examiner—L. Heyman
Attorney, Agent, or Firm—Howard S. Reiter

[57] ABSTRACT

The automated catalytic reduction system for an engine exhaust stream includes an oxidation catalyst spaced from a selective catalytic reduction catalyst for reducing nitrogen oxides. A reducing agent is introduced into the space between the two catalysts and is controlled in volume by a volume control valve. Transducers connected to the engine provide real time engine operating parameter signals to a processor which has stored map data indicating instantaneous nitrogen oxide values for various engine loads. The processor selects an instantaneous nitrogen oxide value in response to the engine condition signals and uses this value to calculate a setpoint value for comparison with the flow volume of the reducing agent. Any difference resulting from this comparison causes the processor to operate the control valve to equalize the flow volume with the setpoint value.

16 Claims, 2 Drawing Sheets

AUTOMATED CATALYTIC REDUCTION SYSTEM

TECHNICAL FIELD

This invention relates generally to catalytic emission control systems for internal combustion engines, and more particularly to an automated catalytic reduction system for lean burning diesel or dual fuel engines.

BACKGROUND ART

One of the major sources of nitrogen oxides ($NO_x$), carbon monoxide (CO), and hydrocarbon (HC) emissions is the combustion of fossil fuels in internal combustion engines. Catalytic controls have been used effectively for many years to control these emissions from automobiles and other rich burning internal combustion engines. However, it is now desirable to control similar emissions in lean burning engines, such as diesel and dual fuel engines which can run on diesel fuel or natural gas.

The formation of nitrogen oxides in internal combustion engines is primarily caused by the oxidation of nitrogen in the air within the combustion chamber of the engine. While both nitric oxide (NO) and nitrogen dioxide ($NO_2$) are formed as final products, nitric oxide is the predominant product emitted. The three factors that contribute most to nitrogen oxide formation are high combustion temperature, pressure, and oxygen availability.

The formation of carbon monoxide in internal combustion engines is a result of the incomplete combustion of fuel which occurs when there is insufficient oxygen near the hydrocarbon (fuel) molecule during combustion. Also incomplete combustion could be caused by the quenching of the hydrocarbons near a cold surface in the combustion chamber. Since the diesel and the natural gas fuels used in dual fuel engines are predominantly hydrocarbons, some of these hydrocarbons will pass through the combustion chamber of the engine unreacted, thus retaining their original form in the exhaust stream. Other hydrocarbons will be partially combusted and also remain in the exhaust stream. Thus, the exhaust stream of a diesel or dual fuel engine contains measurable amounts of nitrogen oxides, carbon monoxide, and unburnt hydrocarbons.

It is imperative that when catalytic units are used with diesel or dual fuel engines to reduce exhaust emissions, the catalyst must remain effective over long periods of engine operation without significant degradation in catalyst activity. To accomplish this, a reducing agent, such as ammonia, introduced into the engine exhaust stream, must be carefully controlled in relation to the engine exhaust emissions. Otherwise, the reducing agent will be either ineffective or will contribute an added undesirable product to the engine exhaust stream emissions while having a possible detrimental effect on catalytic activity as well as good engine operation.

It has proven to be difficult to both economically and effectively control the use of a reducing agent with a catalytic reduction system for a diesel or dual fuel engine. There is a unique set of performance parameters specific to an engine which is determined by the engine build and which vary when the engine hardware is changed. To deal with these varying engine performance parameters which affect exhaust emissions, sampling devices are placed in the exhaust stream of an engine to draw samples to exhaust analyzers, such as a nitrogen oxide analyzer, to obtain measurements which can be used for control purposes. Systems of this type are both complex, expensive and require an operator who is a well trained technician.

It has been found that performance parameters of a specific engine can be mapped and stored in a central processor unit. This concept is disclosed by U.S. Pat. Nos. 4,368,705 to T. T. Stevenson et al., 4,619,234 to K. Okamoto, and 4,737,914 to K. Abe et al. The adaptation of an engine performance mapping technique for automated catalytic reduction would result in a system that is easy to maintain and operate.

DISCLOSURE OF THE INVENTION

It is a primary object of the present invention to provide a novel and improved automated catalytic reduction system for controlling the exhaust emissions of diesel and dual fuel engines. The system includes the use of a catalyst structure that eliminates the build up of heavy hydrocarbons on the catalyst surface as well as the build up of sulfur compounds which can cause premature deactivation of the catalyst.

Another object of the present invention is to provide a novel and improved automated catalytic reduction system for controlling the exhaust emissions of diesel and dual fuel engines that incorporates both an oxidation catalyst and a selective catalytic reduction catalyst in combination with an automated ammonia feed control system which is not a closed system requiring continuous exhaust gas stream sampling and a nitrogen oxide analyzer. Instead, ammonia injection is controlled in accordance with real time engine parameters and a pre-mapped algorithm based on the performance parameters of a specific engine build.

Yet another object of the present invention is to provide a novel and improved automated catalytic reduction system for controlling the exhaust emissions of diesel and dual fuel engines wherein a pregenerated algorithm based on engine performance parameters for loads ranging between 50 and 100 percent is used to compute an instantaneous nitrogen oxide value. This is combined with real time pre-turbine temperature, air manifold temperature, and engine load values as well as ammonia pressure, differential pressure and temperature values to control the ammonia flow through an orifice or flow metering device to a catalytic unit.

A still further object of the present invention is to provide an automated catalytic reduction system for controlling the exhaust emissions of diesel and dual fuel engines which incorporates a reliable and economical automatic ammonia control to inject ammonia into the exhaust stream to be intimately mixed with the nitrogen oxide constituents of the exhaust, while minimizing ammonia emissions in the exhaust discharge. After mixing, the exhaust passes over a base metal catalyst which results in the selective reduction of nitrogen oxides to form nitrogen and water.

These and other objects of the present invention include the provision of a novel and improved automated catalytic reduction system for controlling the exhaust emissions in the exhaust system of a diesel or dual fuel engine. This system includes a catalyst housing mounted in the exhaust system with a catalyst mounted in the housing. The catalyst includes an oxidation catalyst mounted within the housing to initially receive the exhaust stream from the engine and a selective catalytic reduction catalyst within the housing spaced from the oxidation catalyst to reduce the nitrogen oxides in the exhaust stream. A reducing agent is introduced into the housing in the space between the oxidation catalyst and the selective catalytic reduction catalyst, the volume of reducing agent being controlled by a control valve. Transducers are connected to the engine and provide signals to a processor which are indicative of real time engine operating parameters as well as the fuel mode in which the engine is operating. The processor includes stored map data for the specific engine indicating instantaneous nitrogen oxide concentration values for various engine loads, and an instantaneous nitrogen oxide value is selected by the processor in response to the signals from the transducers. The processor uses this nitrogen oxide value to calculate a setpoint value which is a volumetric value that is compared with measured flow volume measurements indicative of reducing agent flow volume. Any difference between the setpoint value and flow volume measurement causes the processor to provide a control signal to the control valve to equalize the reducing agent flow with the setpoint value.

DETAILED DESCRIPTION OF THE PREFERRED EMBODIMENT

In accordance with the present invention, once a diesel or dual fuel engine has been built and the engine hardware such as turbocharger, intake cam, exhaust cams, etc. is incorporated into the engine and will remain unchanged, the engine performance is mapped based upon engine performance parameters for a specific load range. For dual fuel engines where performance is mapped in the dual fuel mode, the load range for which mapping occurs is between 50 and 100 percent, for engine operation at less than 50 percent load is generally not economical. During the mapping operation, a determination of the amount of nitrogen oxide in the engine exhaust stream is performed and a predicted $NO_x$ concentration for each engine load within the load range mapped (i.e., 50%–100%) is developed. These predicted $NO_x$ values are stored in a processor (lookup table) and are accessed in accordance with engine real time operating parameters such as pre-turbine temperature, air manifold temperature, and engine load. Also the fuel mode signal indicating whether or not the engine is operating in the diesel or the dual fuel mode is important, for when a dual fuel engine is operated in the diesel mode, the $NO_x$ emissions are significantly higher than in the dual fuel mode.

Figure 1:
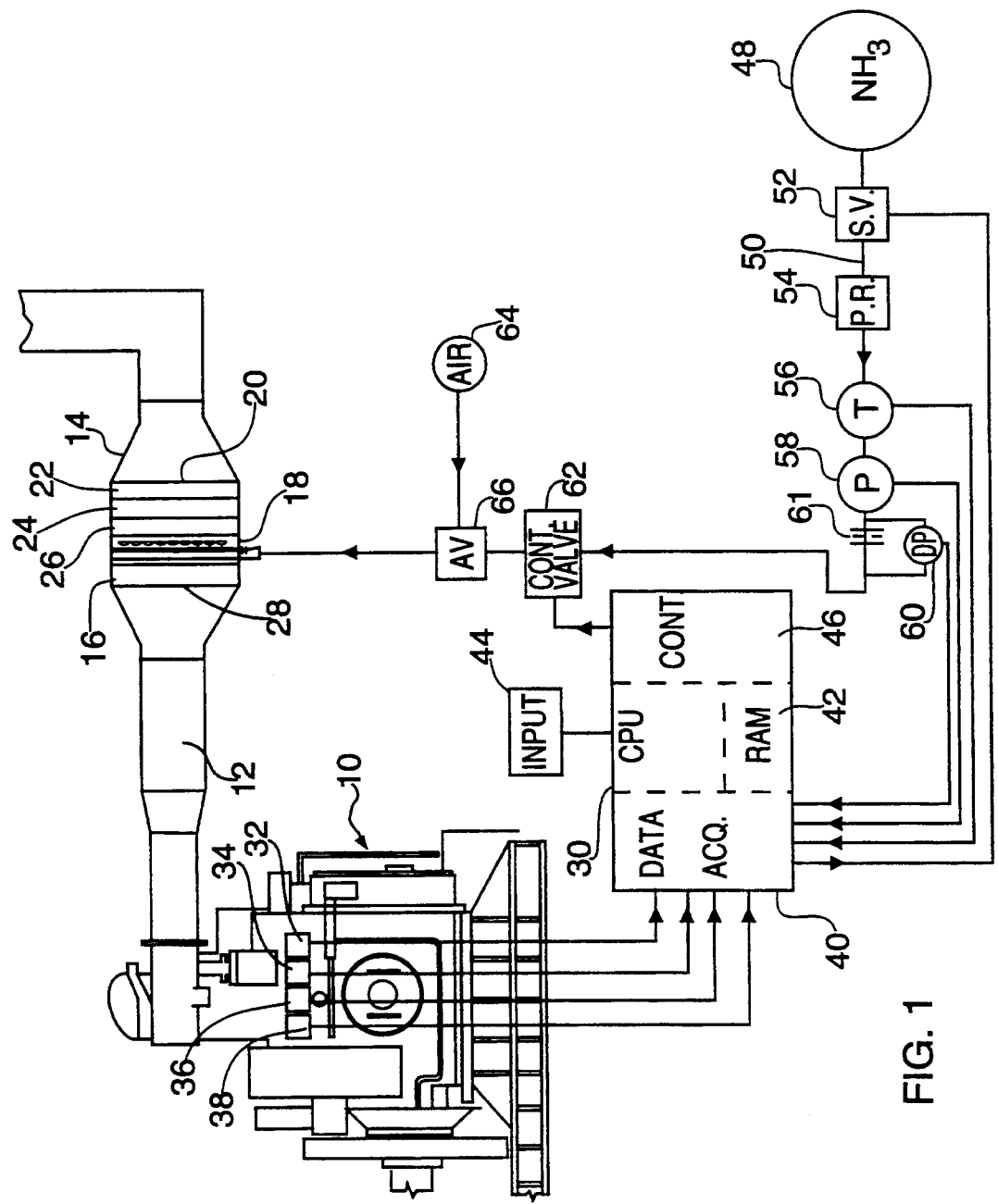
FIG. 1 is a block diagram of the automated catalytic reduction system of the present invention.

Referring now to FIG. 1, a dual fuel engine indicated generally at 10 includes an engine exhaust pipe 12, and in accordance with this invention, a catalyst housing 14 containing a catalyst system is inserted in the engine exhaust pipe so that engine exhaust gas passes through the housing. Within the catalyst housing 14 is an oxidation catalyst 16 which constitutes a grid that extends across the housing and is formed of a precious metal coating on a metal monolith substrate. Exhaust gases from the dual fuel engine 10 first pass through the oxidation catalyst 16 and then pass across a space 18 to a selective catalytic reduction (SCR) catalyst 20. The SCR catalyst consists of three sequential catalyst grids 22, 24 and 26 which extend across the housing 14; each grid being formed from a base metal coating on a metal monolith substrate. Although a plurality of catalyst grids are used, the number of grids may change from one application to another.

The space 18 between the oxidation and SCR catalysts contains an ammonia injection grid 28 consisting of a plurality of tubes provided with injection holes which mix anhydrous ammonia with exhaust gases. Thus the exhaust gases pass first through the oxidation catalyst 16, and are then mixed with ammonia before entering the SCR catalyst 20. By placing the oxidation catalyst upstream of the ammonia injection grid, the potential for oxidizing ammonia to form $NO_x$ is eliminated.

The oxidation catalyst 16 reduces the carbon monoxide and non-methane hydrocarbon emissions by oxidizing them to $CO_2$ and $H_2O$. These oxidation reactions are as follows:

$$2CO + O_2 \rightarrow 2CO_2$$

$$CH_4 + 2O_2 \rightarrow CO_2 + 2H_2O$$

$$C_nH_m + O_2 \rightarrow CO_2 + H_2O \text{ (not balanced)}$$

This process also results in the reduction of the heavy hydrocarbons which minimizes the potential formation of soot on the SCR catalyst 20.

The SCR base metal catalyst 20 is used with ammonia ($NH_3$) as a reducing agent to reduce $NO_x$ emissions in the exhaust from the engine 10. The ammonia is injected into the exhaust stream and is intimately mixed with the $NO_x$ constituents of the exhaust. The exhaust then passes over the base metal catalyst grids 22, 24 and 26 which results in the selective reduction of $NO_x$ to form $N_2$ and $H_2O$. The principal chemical reactions are as follows:

$$6NO + 4NH_3 \rightarrow 5N_2 + 6H_2O$$

$$6NO_2 + 8NH_3 \rightarrow 7N_2 + 12H_2O$$

To achieve the desired $NO_x$ reduction levels while minimizing ammonia emissions, the automated control system of the present invention is provided to ensure maximum performance of the SCR catalyst 20. Insufficient supply of ammonia would not give adequate $NO_x$ reduction, while an excess of ammonia would result in a large ammonia slip into the atmosphere. This will also result in fouling of the SCR catalyst 20 which would create an undesirable back pressure on the engine 10.

The volume of ammonia injected by the ammonia injection grid 28 is controlled by a central processor 30 in response to real time measurements of the pre-turbine temperature, air manifold temperature, and engine load for the dual fuel engine 10. The pre-turbine temperature is measured by a thermocouple 32 positioned in the engine exhaust manifold upstream of the turbocharger for the engine 10, while the air manifold temperature is measured by a thermocouple 34 positioned in the air manifold for the engine. Engine load is measured by a power transducer 36, while a fuel mode signal is derived from a sensor 38. This fuel mode signal indicates whether the engine 10 is operating in the dual fuel mode or in the diesel mode, and the sensor 38 may constitute a set of relay contacts connected to a power supply, which are open when the engine is set to operate in the diesel mode and which are closed when the engine is switched to the dual fuel mode.

The signals from the thermocouples 32 and 34, the kilowatt transducer 36, and the fuel mode sensor 38 are provided to a data acquisition section 40 in the central processor unit 30. These values address the lookup table previously stored in a RAM memory section 42 of the central processor; this lookup table having been previously developed for the engine 10 by mapping the engine performance parameters to compute instantaneous $NO_x$ values for different loads within a load range. Generally, the performance for a specific engine is mapped for loads ranging between 50 and 100 percent once the engine components, such as the turbocharger, intake cams and exhaust cams are set, and if the engine build is modified, then the instantaneous $NO_x$ values must be remapped. Thus, an instantaneous $NO_x$ values is provided and stored for each incremental load within the load range mapped, and a value may be retrieved for a specific load indicated by the combination of sensed values from the engine performance parameter transducers. It should be noted that a diesel engine, or a dual fuel engine operating in the diesel mode, has significantly higher $NO_x$ emissions than an engine operating in the dual fuel mode. However, carbon monoxide and non-methane hydrocarbon emissions are greater in dual fuel mode than in diesel mode. Consequently, the signal from the fuel mode transducer 38 to the data acquisition section 40 is important, as this signal will indicate whether instantaneous $NO_x$ values mapped for engine operation in the dual fuel mode or the diesel mode should be accessed.

To determine the conversion efficiency required for each pollutant in the engine exhaust stream, engine emissions can be measured and tests performed to maximize the conversion efficiency of nitrogen oxides, carbon monoxide and non-methane hydrocarbons. In conducting such tests, an ideal theoretical ammonia/nitrogen oxide ($NH_3/NO_x$) mole ratio can be identified to maximize the conversion efficiency for $NO_x$. Too much ammonia injection into the engine exhaust stream can result in excess $NH_3$ emissions, and consequently it is important to achieve maximum $NO_x$ conversion with a $NH_3/NO_x$ mole ratio which will minimize the injection of excess ammonia into the exhaust stream ($NH_3$ slip). This theoretical $NH_3/NO_x$ mole ratio, which has been determined to be 1.0 for some test engines, is provided to the central processor 30 as a stored reference by a manual input, such as keyboard 44. Once the mapped instantaneous $NO_x$ value is determined by the data acquisition unit 40, the stored $NH_3/NO_x$ mole ratio value is accessed from memory and is multiplied in the central processor unit by the instantaneous $NO_x$ value to obtain a setpoint value for transmittal to a control section 46 of the central processor unit. This setpoint value will be used to control the volume of ammonia injected into the space 18 in the catalyst housing 14.

The ammonia which is injected by the ammonia injection grid 28 is stored in a tank 48, and is provided to an ammonia supply line 50 by a supply control valve 52. The supply control valve is an electrically activated valve controlled by the central processor 30. Various alarm conditions can be preset into the central processor by means of the input 44, and if any of these alarm conditions are sensed, the central processor will close the supply control valve 52 to cut off the ammonia supply.

A manual pressure regulating valve 54 is located in the ammonia supply line 50 to set the ammonia pressure. Transducers are located in the ammonia supply line to compute the ammonia flow. These transducers include an ammonia temperature sensing transducer 56, an ammonia pressure sensing transducer 58, and a differential pressure sensing transducer 60 which senses the differential pressure across the orifice 61 in the ammonia supply line. The outputs from these three transducers are sent to the central processor unit where the ammonia flow is computed from these sensed values. The ammonia flow value is provided to the control section 46, where it is compared with the setpoint value previously computed, and an output signal is provided to a control valve 62 when there is a differential between the setpoint value and the ammonia flow volume. The control valve 62 is opened or closed to adjust the ammonia flow value so that it equals the setpoint value, and the ammonia flow value is constantly adjusted to maintain this relationship.

Between the control valve 62 and the ammonia injection grid 28, air from an air source 64 is mixed with the ammonia flow by means of an air valve 66 to increase the ammonia spray and distribution pressure. The air source 64 may be a source of shop air or any other suitable air source.

The central processor unit 30 may be an integrated processor, such as a microprocessor as shown in FIG. 1, or it may be formed from separate data acquisition systems and control units of known type which form the data acquisition section 40 and the control section 46. For example, the data acquisition section could be provided by a Daytronic 10K2 data acquisition system which provides the instantaneous $NO_x$ signal to an Adac data acquisition system where the instantaneous $NO_x$ is multiplied by the $NH_3/NO_x$ mole ratio. The resultant setpoint value can then be provided to a Labtech PID Controller which compares this setpoint value with the ammonia flow control value and provides an output to the control valve 62. The output of the Labtech PID controller and the Adac data acquisition system can be connected to an NEC computer having multiple screens which are accessed to display alarms. $NH_3/NO_x$ mole ratio values and other read or calculated values.

Figure 2:
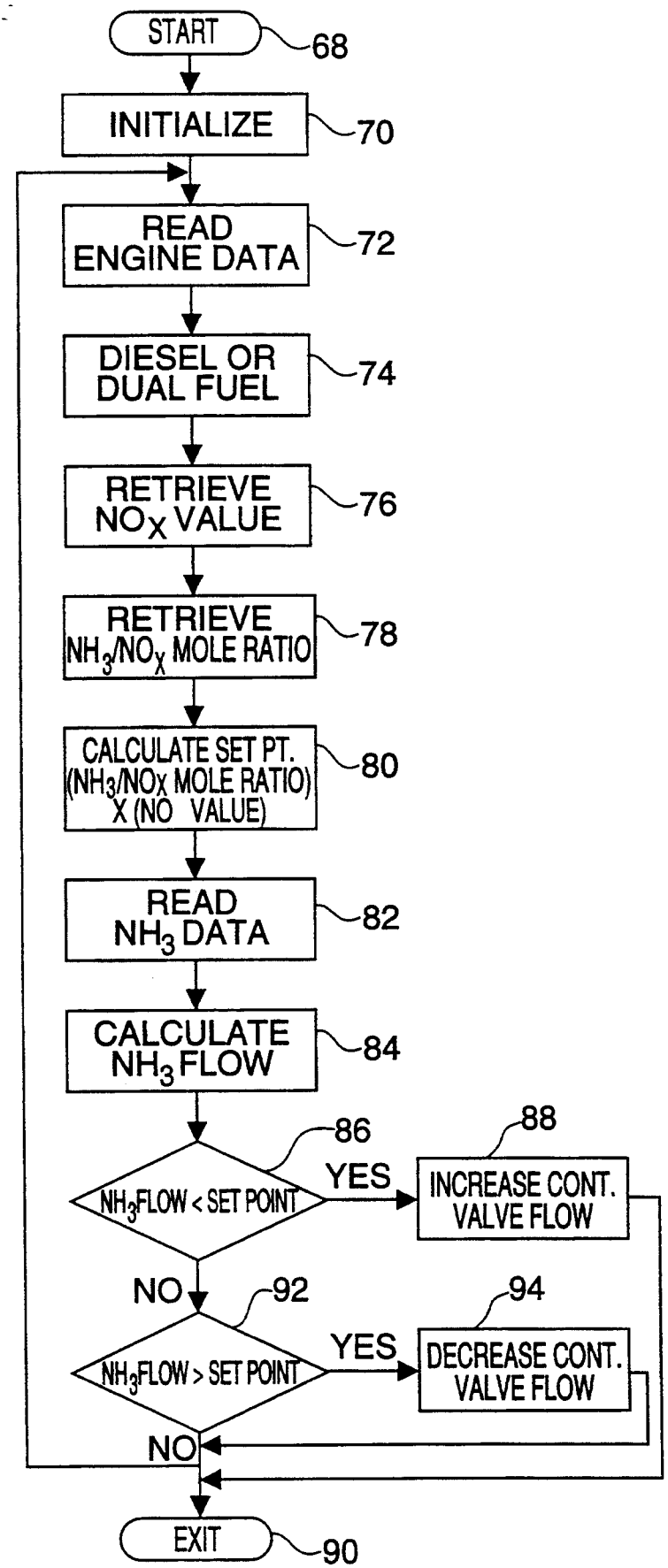
FIG. 2 is a flow diagram representing the control program for the automated catalytic reduction system of FIG. 1.

Referring now to FIG. 2, the control program for the central processor unit 30 is started at 68 when the processor is energized, and at 70 the processor goes through an initialization phase, during which the control valve 62 is activated from the processor. Once the processor completes the initialization phase, engine data from the thermocouples 32 and 34 and the power transducer 36 is read at 72, and then, at 74, a fuel mode determination is made from the fuel mode transducer 38. This information is then used at 76 to retrieve an instantaneous $NO_x$ value from the RAM 42.

Once the processor has retrieved an instantaneous $NO_x$ value, the program operates to retrieve an $NH_3/NO_x$ mole ratio at 78, and this mole ratio is multiplied by the instantaneous $NO_x$ value at 80 to acquire a setpoint value. The program than causes the central processor to read the ammonia flow data at 82 from the temperature transducer 56, the pressure transducer 58 and the differential pressure transducer 60, and this data is then used to calculate an ammonia flow at 84. The ammonia flow is compared with the setpoint value at 86, and if the ammonia flow is less than the setpoint value, the processor program operates at 88 to cause the processor to send a control signal to the control valve 62 to increase the ammonia flow through the control valve until the ammonia flow and the setpoint value are equal. At this point, the program either repeats by reading new engine data at 72, or is exited at 90.

If the ammonia flow at 86 is greater than the setpoint value, the program continues to 92. The processor operates at 94 to the cause the control valve 62 to decrease the ammonia flow until it equals the setpoint value. At this point, the program is either repeated or exited at 90. Similarly, if at 92, it is determined that the ammonia flow value is not greater than the setpoint value, then the program is either again repeated or exited.

INDUSTRIAL APPLICABILITY

The automated catalytic reduction system of the present invention provides reliable and economical ammonia control to a selective catalytic reduction unit designed to reduce the nitrogen oxide emissions for a diesel or dual fuel engine. The system operates with mapped nitrogen oxide values for each load within a load range taken for a specific engine build, and a stored instantaneous nitrogen oxide value is accessed in response to real time engine operating parameters. This $NO_x$ value permits the system to operate effectively to vary and control the ammonia provided to the catalyst.

We claim:

1. An automated catalytic reduction system for controlling the exhaust gas emissions in the exhaust system of an engine operable in both diesel and dual fuel modes comprising:

a catalyst housing mounted in the exhaust system for said engine whereby the exhaust gas from said engine passes through said catalyst housing, catalyst means mounted in said housing and operative to remove components from said exhaust gas.

means to introduce a reducing agent into said housing including a source of said reducing agent and flow rate control means between said source and said catalyst housing to control the volume of reducing agent introduced into said catalyst housing in response to a volume control signal, a fuel mode sensing means operative to generate a signal indicative of whether the engine is operating in one of a diesel mode and a dual fuel mode, said fuel mode sensing means providing a first mode signal when the engine is operating in the diesel mode and a second mode signal when the engine is operating in the dual fuel mode;

condition sensing means connected to said engine and operative to provide condition output signals indicative of real time engine operating parameters, and processor means connected to receive said output signals from said fuel mode sensing means and said condition sensing means and operative in response to said output signals to provide said volume control signal to said flow rate control means for selecting an instantaneous nitrogen oxide value.

2. The automated catalytic reduction system of claim 1 wherein said exhaust gas emissions include carbon monoxide, non-methane hydrocarbons and nitrogen oxides. said catalyst means including an oxidation catalyst means mounted within said catalyst housing whereby exhaust gas from said engine passes first through said oxidation catalyst means, said oxidation catalyst means operating to oxidize the carbon monoxide and non-methane hydrocarbons in said exhaust gas, and a selective catalytic reduction means mounted in said catalyst housing and spaced from said oxidation catalyst means, said selective catalytic reduction means operating to receive the exhaust gas which has passed through said oxidation catalyst and to reduce the nitrogen oxides therein.

3. The automated catalytic reduction system of claim 2 wherein said reducing agent is introduced into said catalyst housing in the space between said oxidation and selective catalytic reduction means.

4. The automated catalytic reduction system of claim 3 wherein said reducing agent is ammonia.

5. The automated catalytic reduction system of claim 1 wherein said processor means includes stored map data indicating exhaust gas instantaneous nitrogen oxide concentration values for engine loads within a load range for said engine.

6. The automated catalytic reduction system of claim 5 wherein said engine includes an exhaust manifold and an air manifold, said condition sensing means including pre-turbine temperature sensing means operative to sense the temperature of said pre-turbine and to provide a pre-turbine temperature signal, air manifold temperature sensing means operative to sense the temperature of said air manifold and to provide an air manifold temperature signal, and an engine load sensing means to sense the load of said engine and to provide an engine load signal.

7. The automated catalytic reduction system of claim 6 wherein said exhaust manifold and air manifold temperature signals and said engine load signal are provided to said processor means, said processor means operating in response to said pre-turbine and air manifold temperature and engine load signals to select the instantaneous nitrogen oxide value from said stored map data.

8. The automated catalytic reduction system of claim 7 wherein said processor means operates to select a higher instantaneous nitrogen oxide value in response to said first mode signal than is selected by said processor means in response to said second mode signal.

9. The automated catalytic reduction system of claim 7 wherein said reducing agent is ammonia, said processor means includes input means for receiving an $NH_3/NO_x$ mole ratio value and storage means to store a mole ratio value provided by said input means, said processor means operating to multiply said instantaneous nitrogen oxide value by said mole ratio value to obtain a setpoint value.

10. The automated catalytic reduction system of claim 9 wherein said means to introduce a reducing agent into said housing includes ammonia sensing means to sense characteristics of the ammonia between said source of reducing agent and said variable volume control means, said ammonia sensing means operating to provide sense signals to said processor means, said processor means operating to calculate an ammonia flow value from said sense signals and to compare said ammonia flow value with said setpoint value to obtain said volume control signal.

11. The automated catalytic reduction system of claim 10 wherein said ammonia sensing means include temperature sensing means to sense the temperature of said ammonia, pressure sensing means to sense the pressure of said ammonia, and differential pressure sensing means to sense the differential pressure of said ammonia.

12. The automated catalytic reduction system of claim 7 wherein said processor means employs said instantaneous nitrogen oxide value to calculate a setpoint value, said means to introduce a reducing agent into said catalyst housing including reducing agent sensing means to sense flow characteristics of said reducing agent and to provide flow characteristic signals to said processor means, said processor means operating to calculate a reducing agent flow value from said flow characteristic signals and to compare said reducing agent flow value with said setpoint value to obtain said volume control signal.

13. The automated catalytic reduction system of claim 12 wherein said exhaust gas emissions include carbon monoxide, non-methane hydrocarbon and nitrogen oxides, said catalyst means including an oxidation catalyst means mounted within said catalyst housing whereby exhaust gas from said engine passes first through said oxidation catalyst means, said oxidation catalyst means operating to oxidize the carbon monoxide and non-methane hydrocarbon in said exhaust gas, and a selective catalytic reduction means mounted in said catalyst housing and spaced from said oxidation catalyst means, said selective catalytic reduction means operating to receive the exhaust gas which has passed through said oxidation catalyst and to reduce the nitrogen oxides therein.

14. The automated catalytic reduction system of claim 13 wherein said reducing agent is introduced into said catalyst housing in the space between said oxidation and selective catalytic reduction means.

15. The automated catalytic reduction system of claim 14 wherein said reducing agent is ammonia.

16. The automated catalytic reduction system of claim 15 wherein said processor means includes input means for receiving an $NH_3/NO_x$ mole ratio value and storage means to store a mole ratio value provided by said input means, said processor means operating to multiply said instantaneous nitrogen oxide concentration value by said mole ratio value to obtain a setpoint value.

* * * * *